(12) United States Patent
Bohlmann et al.

(10) Patent No.: US 9,047,095 B2
(45) Date of Patent: Jun. 2, 2015

(54) EMBEDDING OF A NON-IMPERATIVE PROGRAMMING LANGUAGE FOR DATA TRANSFORMATION OPERATIONS WITHIN AN IMPERATIVE PROGRAMMING LANGUAGE

(75) Inventors: Karsten Bohlmann, Rauenberg (DE); Stefan Bresch, Offenburg (DE); Welf Walter, Rauenberg (DE); Thilo Boehm, Heidelberg (DE)

(73) Assignee: SAP SE, Walldorf (DE)

( * ) Notice: Subject to any disclaimer, the term of this patent is extended or adjusted under 35 U.S.C. 154(b) by 844 days.

(21) Appl. No.: 13/181,038

(22) Filed: Jul. 12, 2011

(65) Prior Publication Data
US 2013/0019229 A1    Jan. 17, 2013

(51) Int. Cl.
G06F 9/44    (2006.01)
G06F 9/45    (2006.01)
G06F 9/455   (2006.01)

(52) U.S. Cl.
CPC .. G06F 8/41 (2013.01); G06F 8/76 (2013.01); G06F 9/45504 (2013.01)

(58) Field of Classification Search
CPC .......... G06F 17/2247; G06F 17/30572; G06F 17/30893; G06F 9/45508; G06F 17/3092; G06F 8/30
See application file for complete search history.

(56) References Cited

U.S. PATENT DOCUMENTS

| | | | | |
|---|---|---|---|---|
| 6,637,021 B1* | 10/2003 | Dubey | ........................... | 717/116 |
| 6,754,884 B1* | 6/2004 | Lucas et al. | ................... | 717/116 |
| 7,340,721 B1* | 3/2008 | Bailey | ........................... | 717/113 |
| 7,650,591 B2* | 1/2010 | Bau | ................... | 717/114 |
| 8,191,051 B2* | 5/2012 | Ahmed et al. | ................ | 717/114 |
| 8,266,585 B2* | 9/2012 | Funt et al. | ..................... | 717/110 |
| 2003/0070158 A1* | 4/2003 | Lucas et al. | ................... | 717/114 |
| 2003/0097648 A1* | 5/2003 | Allison | ......................... | 717/114 |
| 2003/0110177 A1* | 6/2003 | Andrei et al. | ................. | 707/100 |
| 2008/0140705 A1* | 6/2008 | Luo | ........................... | 707/103 R |
| 2009/0248765 A1* | 10/2009 | Akidau et al. | ................ | 707/205 |

OTHER PUBLICATIONS

Laurie J. Hendren et al.; Parallelizing Programs with Recursive Data Structures; 1990 IEEE; pp. 35-47; <http://ieeexplore.ieee.org/stamp/stamp.jsp?tp=&arnumber=80123>.*

Hiralal Agrawal et al.; Dynamic Program slicing; 1990 ACM; pp. 246-256; <http://dl.acm.org/citation.cfm?id=93576>.*

(Continued)

Primary Examiner — Thuy Dao
Assistant Examiner — Cuong V Luu
(74) Attorney, Agent, or Firm — Schwegman Lundberg & Woessner, P.A.

(57) ABSTRACT

In an embodiment, a method of computer program compilation is presented. In this method, a compiler for a first programming language is provided. In one example, the first programming language allows a data assignment to depend on a result of a previous data assignment. Source code including a first portion written in the first programming language and a second portion written in a second programming language is accessed, with the second portion representing a data transformation from a first data structure accessible in the first portion to a second data structure accessible in the first portion. In one example, the second programming language prevents a data assignment that depends on a result of a previous data assignment. The source code is compiled using the compiler to generate executable code to be executed by an engine for the first programming language, which includes an interpretation engine to interpret the second portion.

19 Claims, 14 Drawing Sheets

(56) References Cited

OTHER PUBLICATIONS

David E. Culler et al.; Parallel Programming in Split-C; 1993 ACM; pp. 262-273; <http://ieeexplore.ieee.org/stamp/stamp.jsp?tp=&arnumber=1263470>.*

David M. Beazley; SWIG an Easy to Use Tool for Integrating Scripting Languages with C and C++; 1996 usenix.org; 17 pages; <https://www.usenix.org/legacy/publications/library/proceedings/tcl96/full_papers/beazley/>.*

David Tarditi et al.; Accelerator using data parallelism to program GPUs for general-purpose uses; 2006 ACM; pp. 325-335; <http://dl.acm.org/citation.cfm?id=1168898>.*

Nicholas Carriero; Distributed data structures in Linda; 1986 ACM; pp. 236-242; <http://dl.acm.org/citation.cfm?id=512666>.*

\* cited by examiner

STANDARD
ASSIGNMENT
EXAMPLE
500A

```
LINES = "
in(src) out(dst)
{
 $dst.X := $src.KEY.A,
 $dst.Y := $src.B,
 $dst.Z := $src.C
}
"

MAPPER = CL_MAPPING=>CREATE_FROM_SCRIPT( LINES ).
MAPPER->BIND_SOURCE( LV_SRC ).
MAPPER->BIND_TARGET( CHANGING DATA = LV_DST ).
MAPPER->EXECUTE( ).

RESULTS:
LV_DST-X = 69190
LV_DST-Y = 'Walldorf'
LV_DST-Z = 'D'
```

FIG. 5A

CONSTANT
AND CLEAR
ASSIGNMENT
EXAMPLE
500B

```
LINES = "
out(dst)
{
 $dst.X := INT8 '69190',
 $dst.Y := STRING'Walldorf',
 $dst.Z clear
}
"

LV_DST-Z = 'D'.
MAPPER = CL_MAPPING=>CREATE_FROM_SCRIPT( LINES ).
MAPPER->BIND_TARGET( CHANGING DATA = LV_DST ).
MAPPER->EXECUTE( ).

RESULTS:
LV_DST-X = 69190
LV_DST-Y = 'Walldorf'
LV_DST-Z = ''
```

FIG. 5B

STRING
TEMPLATE
EXAMPLE
— 500C

```
LINES = "
in(src) out(dst)
{
  $dst.Y := |{$src.C}ALL{$src.B}|,
}
"

LV_SRC-B = 'DORF'.
LV_SRC-C = 'W'.
MAPPER = CL_MAPPING=>CREATE_FROM_SCRIPT( LINES ).
MAPPER->BIND_SOURCE( LV_SRC ).
MAPPER->BIND_TARGET( CHANGING DATA = LV_DST ).
MAPPER->EXECUTE( ).

RESULTS:
LV_DST-Y = 'WALLDORF'
```

FIG. 5C

CONDITIONAL
EXAMPLE
500D

```
LINES = "
in(src) out(dst)
{
 $dst.X := $src.KEY.A,
 if $src.KEY.A = INT8'69190' { $dst.Y := STRING'Walldorf' }
                        else { $dst.Y := STRING'elsewhere' }
}
"

LV_SRC-KEY-A = 69190.
MAPPER = CL_MAPPING=>CREATE_FROM_SCRIPT( LINES ).
MAPPER->BIND_SOURCE( LV_SRC ).
MAPPER->BIND_TARGET( CHANGING DATA = LV_DST ).
MAPPER->EXECUTE( ).

RESULTS:
LV_DST-X = 69190
LV_DST-Y = 'Walldorf'
LV_DST-Z = ''
```

FIG. 5D

INSERT LINE
EXAMPLE
500E

```
LINES = "
in(src) out(dst_tab)
{
 insert $dst_tab { X := $src.KEY.A },
 insert $dst_tab { Y := $src.B },
 insert $dst_tab { Z := $src.C }
}
"

MAPPER = CL_MAPPING=>CREATE_FROM_SCRIPT( LINES ).
MAPPER->BIND_SOURCE( LV_SRC ).
MAPPER->BIND_TARGET( CHANGING DATA = LT_DST ).
MAPPER->EXECUTE( ).

RESULTS:
LT_DST =
```

| X | Y | Z |
|---|---|---|
| 69190 | | |
| | Walldorf | |
| | | D |

FIG. 5E

LOOP AND
INSERT LINE
EXAMPLE
500F

```
LINES = "
in(src_tab) out(dst_tab)
{
 for $src_tab
 {
  insert $dst_tab
  {
   X := KEY.A,
   Y := B,
   Z := C
  }
 }
}
"

MAPPER = CL_MAPPING=>CREATE_FROM_SCRIPT( LINES ).
MAPPER->BIND_SOURCE( LT_SRC ).
MAPPER->BIND_TARGET( CHANGING DATA = LT_DST ).
MAPPER->EXECUTE( ).

RESULTS:
LT_DST =
```

| X | Y | Z |
|---|---|---|
| 69190 | Walldorf | D |

FIG. 5F

LOOP WITH WHERE CLAUSE
EXAMPLE
╭─ 500G

```
LINES = "
in(src_tab, item_tab) out(dst_tab)
{
 for item in $item_tab
 {
  for src in $src_tab where KEY.A = $item.PARENT.E
  {
   insert $dst_tab
   {
    X := $src.KEY.A,
    Y := $item.F,
    Z := $item.KEY.D
   }
  }
 }
}
"

MAPPER = CL_MAPPING=>CREATE_FROM_SCRIPT( LINES ).
MAPPER->BIND_SOURCE( PARAMETER = 'src_tab' DATA = LT_SRC ).
MAPPER->BIND_SOURCE( PARAMETER = 'item_tab' DATA = LT_ITEM ).
MAPPER->BIND_TARGET( CHANGING DATA = LT_DST ).
MAPPER->EXECUTE( ).
```

RESULTS:
LT_DST =

| X | Y | Z |
|---|---|---|
| 69190 | Walldorf North | 1 |
| 69190 | Walldorf South | 1 |
| 69190 | Walldorf East | 1 |
| 69190 | Walldorf West | 1 |

FIG. 5G

EMBEDDING OF A NON-IMPERATIVE PROGRAMMING LANGUAGE FOR DATA TRANSFORMATION OPERATIONS WITHIN AN IMPERATIVE PROGRAMMING LANGUAGE

FIELD

The present disclosure relates generally to programming of computer-based systems. In an example embodiment, the disclosure relates to the embedding within a program written in a first programming language source code that is written in a second programming language.

BACKGROUND

Many different programming languages have been developed over several decades to address a wide variety of applications or problems. Examples of these programming languages include FORTRAN, C, COBOL, LISP, C++, Java, and many others. In many cases, a particular programming language has been developed to address a specific type of application. For example, FORTRAN was primarily developed for mathematical and control system environments, COBOL was intended primarily for business applications, and LISP was directed to list processing tasks. However, given the continually increasing size and complexity of modern computer programs, many cases exist in which no single programming language is ideally suited to address all types of tasks that are to be handled within a single computer program.

BRIEF DESCRIPTION OF DRAWINGS

The present disclosure is illustrated by way of example and not limitation in the figures of the accompanying drawings, in which like references indicate similar elements and in which:

FIGS. 5A through 5G are listings of source code examples written in an example of the second programming language of FIG. 1;

DETAILED DESCRIPTION

Figure 1:
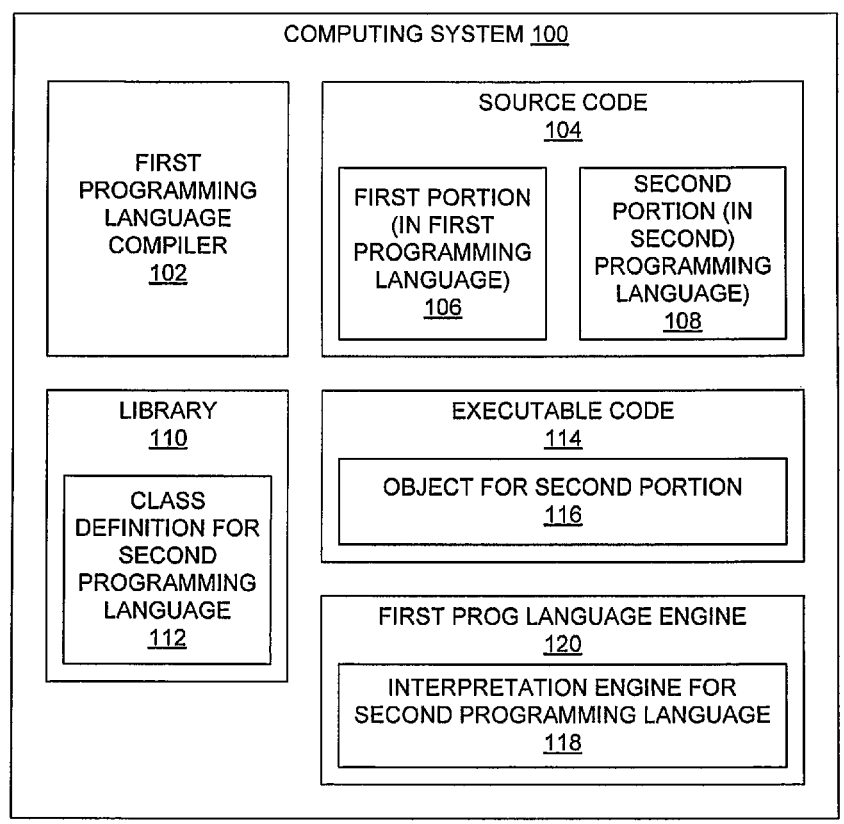
FIG. 1 is a block diagram depicting an example computing system for compiling source code including a first portion written in a first programming language and a second portion written in a second programming language to generate executable code.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The embodiments described herein provide various techniques for embedding source code written in one programming language within source code written in another programming language. This capability may allow a computer programmer to write computer program source code in two or more languages within a single program or executable code set. In one example, a programmer may select a first language for a particular set of tasks, and select a second language for another set of tasks.

In the embodiments discussed below, the embedding of one programming language in within another may take multiple forms. In one example, the source code of a second programming language may be provided as text or character strings within the first programming language, with any compilation or interpretation of the second programming language occurring at runtime of the first programming language. In another example, the second programming language may be embedded syntactically within the syntax of the first programming language. To facilitate this type of embedding, the compiler of the first programming language may be extended to compile the source code written in the second programming language, or the compiler of the first language may include, or communicate with, a compiler for the second language, in which case the source code written in the second programming language may be compiled during the compile time of the first programming language. In yet other implementations, some combination of these two examples may be employed.

Computer programs for a variety of environments and applications are often written in an imperative language, such as FORTRAN and C. Similarly, many business and enterprise-resource computer applications are written in. ABAP (Advanced Business Application Programming), created by SAP AG of Walldorf, Germany. Generally, an imperative programming language allows a computer programmer to accomplish computer-related tasks by way of writing a computer program that includes a list of computer-executable statements that are to be executed in a particular order. At least some of the statements, such as statements in which a variable is both an input and an output (for example, the incrementing of a variable) generate "side effects" which alter the current "state" of the program. As a result, the state of the program at a particular point in time during execution is typically dependent upon the order in which the statements are executed up to that point.

An important task often performed within a computer program is the transformation or mapping of data from one type of data structure to another. This type of transformation occurs, for example, when passing data from one computer program layer to another, such as when calling an application programming interface (API). Examples of this type of data transformation include the mapping of data from hierarchical tables to "flat" or non-hierarchical tables, and vice-versa. At times, the data structures involved may be rather large and/or complex, thus possibly requiring a significant amount of time to complete the transformation.

To make such data transformations more efficient, optimization of the code performing the transformation may be desired. For example, in some cases, portions of the code may be "parallelized" by being executed on different processors in order to reduce overall execution time. However, when such code is written using an imperative language, the potential for side effects may limit the amount of parallelization and other optimization that is possible. Additionally, any imperative language code that may be optimized may be difficult for an imperative language compiler to determine.

Generally, imperative programming languages are distinguished from declarative programming languages, which typically allow a computer programmer to define the expected results of a program, as opposed to explicitly defining the specific operations, and desired order thereof, to achieve those results. A type of declarative programming language is a functional programming language, in which an output of a function or task is dependent only upon the values of the inputs to that function, as opposed to other outputs of the function. Thus, functional programming generally avoids the generation of side effects to other portions of a function. This lack of side effects allows parallelization and other optimization to be employed more easily for source code written in a declarative language compared to one expressed in an imperative language.

At least some of the embodiments described herein facilitate the embedding of source code written in a non-imperative programming language within source code written in an imperative programming language. By allowing a programmer or programming team to write programming code in such a fashion, legacy imperative source code may be retained and utilized while the programmer develops more time-critical or often-used portions of the source code in a non-imperative programming language to employ parallelization and other optimization techniques more easily, thus enhancing performance of the overall executable code. Such enhancement is especially significant if the compiler for the imperative language is not particularly adept at employing sophisticated optimization techniques found in newer compilers. Other aspects of the embodiments discussed herein may be ascertained from the following detailed description.

FIG. 1 is a block diagram of an example computing system 100 for allowing the embedding of source code written in one programming language within a program written in another programming language. As shown in FIG. 1, the computing system 100 includes a compiler 102 for a first programming language (for example, an imperative programming language) in which data assignments that depend on the result of at least one previous data assignment are allowed. The computing system 100 also accesses or receives source code 104 that includes a first portion 106 written in the first programming language and a second portion 108 written in a second programming language. In one example, the second programming language (for example, a non-imperative language, such as a declarative or functional programming language) may prevent data assignments that depend on the results of one or more previous data assignments.

To allow the interpretation (or compilation) of the second portion 108 of the source code 104, the computing system 100 may include, in one example, a library 110 that includes a class definition 112 for the second programming language. In one implementation, the class definition 112 includes information used to properly interpret (or compile), possibly optimize, and execute the logic represented in the second portion 108 of the source code 104. In other implementations, other methods or data structures other than a class definition may be employed to provide the information used to process the second portion 108 of the source code 104, such as syntactically embedding the second programming language within the syntax of the first programming language, as described above.

The compiler 102, in conjunction with the class definition 112 in the library 110, compiles the source code 104 to generate executable code 114 that may be executed or run on the computing system 100 or another computing system not shown in FIG. 1. In one example, the executable code 114 includes or creates an object 116 representing the programming logic of the second portion 108 of the source code 104. Also provided is an execution engine 120 for the first programming language, which may include, or be coupled with, an interpretation engine 118 for the second programming language that may perform any interpretation or compilation and optimization of the second portion 108 of the source code 104 to yield the object 116 representing the second portion 108, and the subsequent execution of the representation of the second portion 108 in the object 116. Such an interpretation engine 118 may be a single instance capable of executing any parts of the executable code 114 generated from the second portion 108 of the source code 104. In one example, all compilation or interpretation, optimization, and execution occurs during runtime of the executable code 114 after compilation by the first language compiler 102 has completed. In another example, the second portion 108 of the source code 104 may be compiled prior to runtime by way of a second programming language compiler integrated with, or coupled to, the first programming language compiler 102, as indicated above.

In one example, the second programming language may be a scripting language, such that source code written in the second language is interpreted as it is being executed instead of being compiled completely beforehand. In other embodiments, the second programming language may be a language that is compiled completely before execution begins, as described above. In yet other examples, the second programming language may be one in which the source code is at least partially compiled prior to execution, as mentioned earlier. In cases in which the first programming language is bytecode-based (such as Java™, by Oracle Corporation), the source code for the second programming language may be compiled to the bytecode used for the first programming language.

Figure 2:
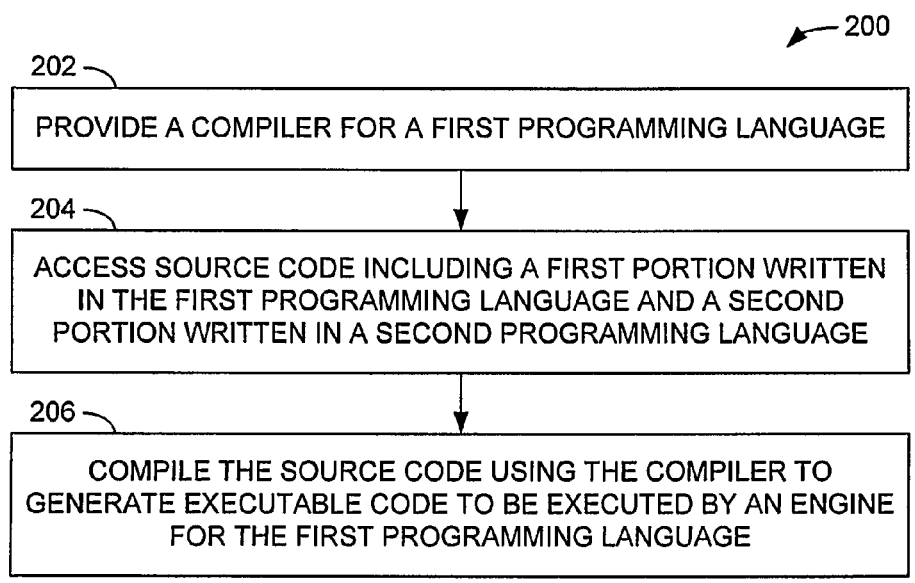
FIG. 2 is a flow diagram of an example method of compiling source code including a first portion written in a first programming language and a second portion written in a second programming language to generate executable code as depicted in FIG. 1.

FIG. 2 provides a flow diagram of an example method 200 of allowing the writing of source code that includes portions written in two different programming languages. In one example, the method 200 may be implemented using the computing system 100 of FIG. 1, but the method 200 may be employed using other systems with varying structures, components, and/or modules in other implementations. In the method 200, a compiler is provided for a first programming language (operation 202). Source code is accessed, wherein the source code includes a first portion written in a first programming language and a second portion written in a second programming language (operation 204). The source code is compiled using the compiler to generate executable code to be executed by an engine for the first programming language (operation 206).

In one example, the engine for the first programming language includes, or is coupled to, an interpretation engine to interpret the second portion of the source code during execution of the executable code. As a result, the logic reflected in the second portion of the source code may operate directly upon data structures of the first portion of the source code associated with the first programming language. Such an approach may reduce or eliminate any data serialization or "marshalling" that may otherwise be necessary to pass data from one execution engine to another. In the examples described in greater detail below, the second programming language is a non-imperative scripting language directed to the transformation or "mapping" of data from a source data structure to a destination (or "result") data structure. Typically, transformation operations of this type are notorious for their consumption of processing bandwidth. Also, such functions may be executed repeatedly, especially in computer programs in which the data in one or more data structures are transformed or mapped from one format used by one portion of a program to a significantly different format employed by another portion of the program. Examples of such mappings may include, but are not limited to, mapping a hierarchical data structure to a flat table, mapping a flat table to a hierarchical data structure, mapping a table or hierarchical data structure to another table or hierarchical data structure, and enhancing or modifying a table or hierarchical data structure. However, in other examples, the second programming language may be directed to other specific types of operations, or may be a more general-purpose programming language intended for a wider variety of tasks.

Figure 3:
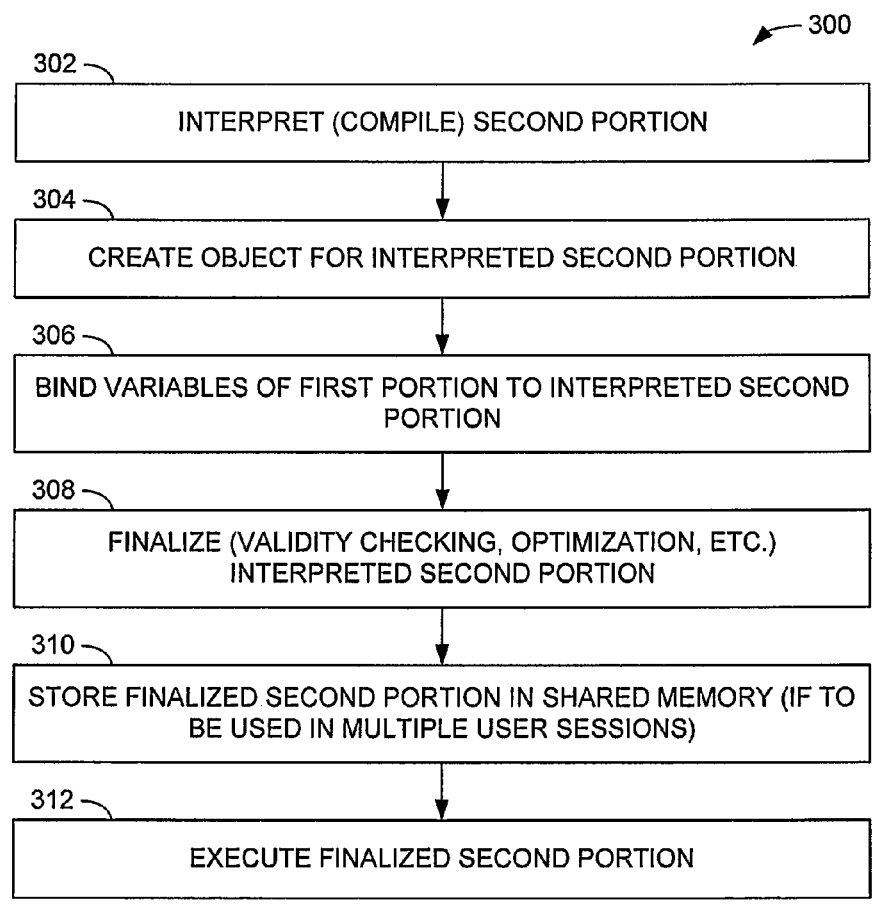
FIG. 3 is a flow diagram of an example method of preparing and executing the second portion of source code of FIG. 1 during execution of the executable code.

FIG. 3 is a flow diagram of an example method 300 of processing the second portion 108 of the source code 104 for execution. In the method 300, the second portion 108 is interpreted or compiled (operation 302) to yield the programming logic represented in the second portion 108. In one example, the logic of the second portion 108 is processed to generate an evaluation tree representing the particular data mapping that is to be accomplished. In one implementation, the evaluation tree may be represented as a C++ data structure, such as an object graph. However, other representations or structures other than an evaluation tree may be employed for such a purpose in other examples. In the process of the interpretation or compilation of the second portion 108, errors or faults in the logic discovered in the second portion 108 may be noted, thus preventing use of the second portion 108 logic within the executable code 114.

In conjunction with, the interpretation or the compilation of the second portion 108 of the source code 104, an object may be created for the interpreted or compiled second portion 108 (operation 304). In one example, the created object is an instance of an object-oriented class for the first programming language, with the class defining the programming logic (for example, data structure mapping) of the second portion 108. The object may include, for example, an evaluation tree representing that logic, as mentioned above.

In one implementation, the interpretation/compilation of the second portion 108, and/or the creation of the object representing the logic of the second portion 108, may be performed by the interpretation engine 118 of FIG. 1 during runtime of the executable code 114. In one example, the second portion 108 is coded as a character string or other set of data that may then be read and compiled or interpreted via the interpretation engine 118. Example character strings including the second portion 108 are discussed in greater detail below in conjunction with FIGS. 5A through 5G.

In one example, at this point in the method 300, the object and/or the interpreted or compiled second portion 108 are not associated with any data typing information that may describe source or destination data structures that may be involved in the desired mapping. Instead, the elements or nodes of a source or destination data structure associated with the mapping may be referred to via an abstraction mechanism involving the use of formal parameters in the second portion 108. Accordingly, variables or elements of the data structures specified in the first portion 106 of the source code 104 may then be bound to the formal parameters of the interpreted or compiled second portion 108 (operation 306). In one example, these bindings are noted in the generated object representing the second portion 108 of the source code 104.

By waiting to bind variables (and their types) to formal parameters until runtime of the executable code 114, mappings may be written for data structures that are created dynamically during runtime. Conversely, other mappings that are generally compiled prior to runtime, such as those written in an imperative programming language, cannot be applied to data types that are dynamically created at runtime. In some implementations, not all of the variables, components, or elements of the data structures associated with the mapping may be bound to a formal parameter, as the second portion 108 may not reference those variables, components, or elements.

In addition to binding variables to formal parameters, the representation of the second portion 108 of the source code 104 may be finalized (operation 308). In one example, as part of a finalization process, the interpretation engine 118 may perform a validity check on the representation or object, such as checking various aspects of the mapping with the variables that have been bound to the formal parameters of the second portion 108 for validity, such as an assignment of data from one source data type to the same type or a compatible result data type.

As part of the finalization process, the representation of the second portion 108 (in other words, the mapping) may also be optimized to allow parallelization of multiple mapping operations. In one example, such parallelization may include insertion or copying of multiple lines of a table data structure, insertion or copying of multiple components of a source hierarchical data structure to corresponding components of a result data structure, and/or the like.

After finalization of the object or representation of the second portion 108 of the source code 104, the finalized object or representation may be stored in shared memory so that multiple execution sessions or threads may access and employ the object (operation 310). Storing the mapping in such a fashion will prevent the recompilation or reinterpretation of the mapping each time the mapping is to be executed. In one example, the executable code 114 may maintain an implicit cache of compiled or interpreted mappings for use in multiple threads, user sessions, and so on. In other implementations, the runtime system for the second programming language may cache compiled mappings in a similar fashion for second portions 108 of the source code 104 that are executed multiple times.

Also after finalization of the mapping, the mapping may be executed (operation 312). In at least some of the examples discussed herein, executable code 114 generated from the first portion 106 of the source code 104 may identify a source data structure and a result data structure, and invoke the mapping generated from the second portion 108 of the source code 104 to perform the transformation of data from the source data structure to the result data structure. More generally, multiple source and/or result data structures may be utilized in a mapping in other examples.

Figure 4:
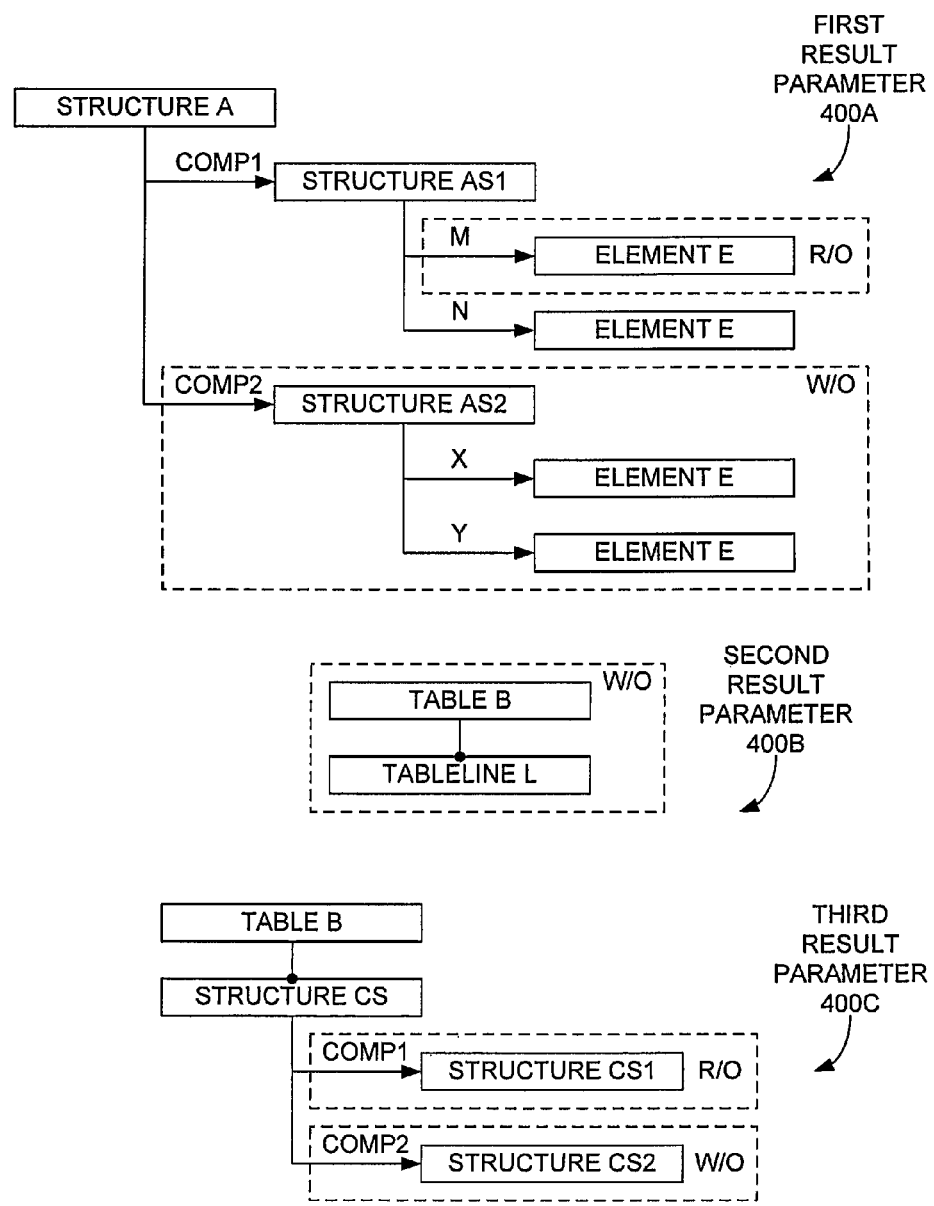
FIG. 4 is a graphical representation of examples of result data structures serving as destinations for data structure mapping defined in the second portion of source code of FIG. 1, wherein the elements of the structure may be designated as read-only or write-only.

FIG. 4 is a graphical representation of several example result data structure parameters having elements or components that the interpretation engine 118 may designate as write-only or read-only to promote mapping optimization. As discussed above, a non-imperative programming language generally prevents results of assignments from being employed as source data for other assignments. This programming restriction typically favors "push-mode" mappings, in which a mapping is driven by the data or content of the source data structure, which is not changed during the mapping operation. For example, the values of each component of the result data structure, or even the identity of which components of the result data structure are to be written or updated, may depend on particular values of the source data structure.

However, "pull-mode" mappings, in which preexisting data or content of the result data structure controls at least some of the mapping operation, are often useful in cases in which the result data structure is partially or wholly initialized prior to the mapping operation. To allow the use of pull-mode mappings, at least some components of the result data structure may be designated as input or source data while maintaining a non-imperative or functional coding structure. In one example, result data structure components may be designated as "write-only" for the mapping operation so that those components may be updated during the mapping, while other result data structure components may be designated as "read-only" so that those components may provide source data to control the mapping process. In marking at least some of the result data structure components in such a manner, the non-imperative nature of the mapping, and the potential benefits of optimization that may follow therefrom, may be maintained. In one example, compilation of the mapping code provides for automatic marking of the data structures based on the initial input and output parameter declarations and inspection of the program constructs. In another example, the user may mark the result data structure components manually.

In FIG. 4, a first result parameter 400A is shown as a result data structure of type A having two components, COMP1 (of type AS1) and COMP2 (of type AS2). Each of these components COMP1, COMP2 includes two components of element type E, with COMP1 having components M and N, while COMP2 includes two components X and Y. In this example, component M is marked as read-only, indicating that the data in those components may be employed as source data, and thus are not to be written during the mapping. Oppositely, all of component COMP2, including its subcomponents X, Y, is marked as write-only, indicating that X and Y are to be updated during the mapping, and thus are not to provide source data for, or otherwise control or direct, the mapping operation. In one example, the marking of COMP2 as a write-only component causes all subcomponents of COMP2 (in this case, components X and Y) to be marked as write-only as well to ensure consistency in write-only and read-only components to maintain the non-imperative nature of the mapping. In such an implementation, marking a component as read-only will cause all subcomponents or sub-nodes of that component to be designated in a similar fashion.

In FIG. 4, a second result parameter 400B is a table of type B that includes table lines of type L, with the entire table being marked as write-only. As a result, none of the table serving as the second result parameter 400B may be employed as a source of data for the mapping operation.

A third result parameter 400C for the mapping operation is a table of type B that includes a number of lines, with each line including a structure of type CS. Further, each such structure includes two components: component COMP1 (including a structure of type CS1) and COMP2 (including a structure of type CS2). In this example, COMP1 is marked as a read-only component capable of being employed in a pull-mode mapping, while COMP2 is designated as a write-only component, and thus cannot provide source data or otherwise control the mapping operation.

In one implementation, the interpretation engine 118 determines the designations for at least some of the components of the result data structures based on the context in which each component is employed in the second portion 108 of the source code 104. In one example, the interpretation engine 118 produces an error or exception at the time of compilation of the second portion 108 if a conflict between read-only and write-only designations occurs. For instance, a component which is designated as read-only that contains a write-only subcomponent (or vice-versa) would cause such a compile-time error or exception. In another example, the programmer may explicitly designate which components are read-only and write-only in the second portion 108 of the source code 104, as mentioned above. Also, in some embodiments, not all of the result data structure components need be designated, such as, for example, subcomponent N of the component COMP1 of the first result parameter 400A. This lack of designation may occur if the component in question is not employed as either a source or result component in the mapping. As a result, component COMP1 of the first result parameter 400A is a read-write structure, instead of a read-only or write-only structure.

FIGS. 5A through 5G each provides a simplistic code example of the second portion 108 of the source code 104 written in the second programming language, followed by a segment of the first portion 106 of the source code 104 written in the first programming language to generate and execute the mapping operation represented in the second portion 108. Below the first programming language code is a listing of the data contents generated for the result data structure as a result of the mapping operation. While the examples presume a particular syntax and statement structure for each of the first programming language and the second programming language, other examples of each of the languages may be utilized in other embodiments.

FIG. 5A provides an example 500A of a standard data assignment of components of a result data structure based on values of components in a source data structure. The second portion 108 is written as a function represented by a character string that causes components X, Y, and Z of a destination data structure referenced by the formal parameter 'dst' to be written from specific components KEY.A, B, and C of a source data structure referenced by the formal parameter 'src', respectively. The mapping is written in the second programming language and stored as a character string named LINES.

Shown thereafter is a set of statements of the first portion 106 of the source code 104 (written in the first programming language) to employ the second portion 108 to perform a mapping operation (FIG. 1). Each of the methods or functions shown may be included in the interpretation engine 118 of FIG. 1 in one implementation. The first of the statements shown in FIG. 5A may cause the creation of an object MAPPER of a class CL_MAPPING using a method CREATE_FROM_SCRIPT based on the input character string LINES, according to some examples described above. As part of the object creation process, the method CL_MAPPING may also perform one or more finalization or optimization tasks, as discussed above. After the object MAPPER is created, a call to a method BIND_SOURCE causes the data structure LV_SRC to be bound to the formal parameter 'src' of the second portion 108. Similarly, a call to a method BIND_TARGET binds a data structure LV_DST to the formal parameter 'dst' of the second portion 108. In response to the bindings, further optimization of the resulting executable code may be performed, as some optimizations may not be discoverable until the binding process has been performed. Once the bindings are complete, the first portion 106 executes the mapping of the LV_SRC data structure to the LV_DST data structure by initiating the method EXECUTE.

FIG. 5A then displays the results of the mapping. Presuming the KEY.A, B, and C components of the LV_SRC data structure hold the values of 69190, 'Walldorf', and 'D', respectively, the X, Y, and Z components of the LV_DST data structure are filled with the same values, as indicated in the second portion 108 of the source code 104. Thus, FIG. 5A provides a simplified example of an assignment mapping from a source data structure to a result (destination) data structure.

FIG. 5B provides an example 500B involving assignments of constants to result components, and clearing of result components. In this example, the second portion 108 indicates that, within a result data structure 'dst', a component X is to be written with an integer value of 69190, a component Y is to be written with a string 'Walldorf', and a component Z is to be cleared. Since no source data structure is employed in the mapping operation, the second portion 108 recites only a result or destination formal parameter 'dst'.

In the first portion 106 of the source code 104 (FIG. 1), the component Z of the data structure LV_DST is initialized with the character 'D'. Thereafter, the object MAPPER is created using the CREATE_FROM_SCRIPT method, and the result data structure LV_DST is bound to the formal parameter 'dst' of the second portion, as was performed in the example of FIG. 5A. Since no source data structure is specified for this mapping, a call to the method BIND_SOURCE is not performed. After the creation of the object MAPPER and subsequent binding, the mapping is accomplished via a call to the EXECUTE method associated with the MAPPER object. The mapping thus results in the X component of the LV_DST data structure being set to 69190, the Y component being written with the 'Walldorf' character string, and the Z component being cleared in spite of having previously been initialized to the character value 'D'.

FIG. 5C provides an example 500C of a string template assignment mapping. In this example, the second portion 108 represents a mapping of the values of two separate components C and B of a source data structure indicated by the formal parameter 'src' being combined with a character string 'ALL' before storing the resulting value in a component Y of a destination data structure denoted by the formal parameter 'dst'. In the first portion 106 of the source code 104, the component B of a data structure LV_SRC is initialized to the character string 'DORF', while the component C of the same structure is initialized to the character 'W'. Thereafter, the MAPPER object is created, the LV_SRC data structure is bound to the 'src' formal parameter, a LV_DST data structure is bound to the formal parameter 'dst', and the mapping is executed, as was shown in FIG. 5A above. As a result of the mapping, a Y component of the result data structure LV_DST is set to 'WALLDORF', due to the combination of the character 'W' from the C component of LV_SRC, the constant character string 'ALL', and the character string 'DORF' stored in the B component of LV_SRC, as directed in the mapping specified in the LINES character string representing the second portion 108 of the source code 104.

FIG. 5D presents an example 500D of a conditional operation in which at least a portion of the mapping operation depends upon a value in a source data structure, thus representing a push-type mapping. In the mapping described in the LINES character string, a KEY.A component of a source data structure referenced by a 'src' formal parameter is mapped to an X component of a data structure referenced by a formal parameter 'dst'. Also, if the KEY.A value is found to be equal to an integer value of 69190, a Y component of the 'dst' data structure is set to the character string 'Walldorf'; otherwise, the Y component is set to the character string 'elsewhere'.

In the first portion 106 of the source code 104 shown in FIG. 5D, the KEY.A component of the data structure LV_SRC is set to the 69190 value cited in the second portion 108. As with other examples discussed above, the MAPPER object is created using the second portion 108 as input, the LV_SRC data structure is bound to the 'src' formal parameter, an LV_DST data structure is bound to the formal parameter 'dst', and the mapping described in the second portion 108 is executed. As a result of the mapping operation, the X component of the LV_DST data structure is set to 69190, and the Y component is set to 'Walldorf' in response to the KEY.A component of the LV_SRC data structure holding the value of 69190. Additionally, the Z component of the LV_DST data structure, not having been set as a result of the mapping operation, does not hold a defined value. In another example, the components of all data structures, including the Z component of the LV_DST data structure, would have a type-conforming initial value generated at the time of instantiation of the data structure, such as a zero for numerical data types, NULL for character strings, and so on. In that case, as a result of the mapping of FIG. 5D, the Z component of the LV_DST data structure would continue to possess its initial value after the mapping.

FIG. 5E illustrates an example 500E in which table lines are inserted into a destination table, and select components of the lines are written from component values in a source data structure. In the second portion 108 of the source code 104 located in the LINES character string, three line insert operations are performed, with each being associated with an assignment to a particular component of that line. More specifically, an X component of a first inserted line of a table 'dst_tab' is to be set to the value of the KEY.A component of a 'src' data structure, a Y component of a second inserted line of 'dst_tab' is to be written with the value of the B component of the 'src' data structure, and a Z component of a third inserted line of 'dst_tab' is to be assigned the value of the C component of 'src'.

As in previous examples discussed above, a MAPPER object is created using the second portion 108 of the source code 104 written in the second programming language, and the LV_SRC data structure is bound to the 'src' formal parameter. Also, a table LT_DST is bound to the 'dst_tab' formal parameter, after which the mapping operation is executed. Presuming the LV_SRC data structure is initialized as shown in the example of FIG. 5B (in other words, the KEY.A component equals 69190, the B component holds the character string 'Walldorf', and the C component holds the character 'D'), the mapping operation assigns the 69190 integer to the X component of the first table line of LT_DST, sets the Y component of the second table line of LT_DST to 'Walldorf', and writes the character 'D' to the Z component of the third table line of LT_DST.

FIG. 5F presents an example of a loop-and-insert operation that facilitates assignment of multiple components of an inserted line. As shown in the character string LINES, a 'for' outside loop over each line of a source table parameter 'src_tab' causes the insertion of a new line into a 'dst_tab' destination or result table parameter, along with writing to components X, Y, and Z of the inserted line with values from components KEY.A, B, and C of the current line of the 'src_tab' parameter. In a fashion similar to previous examples, the MAPPER object is created using the mapping code, a table LT_SRC is bound to the 'src_tab' formal parameter, a second table LT_DST is bound to the 'dst_tab' formal parameter, and the mapping is executed. Presuming that the source table LT_SRC includes a single line with a component KEY.A holding an integer value 69190, a component B having a character string of 'Walldorf', and a component C with a character value of 'D', these values are assigned in corresponding order to the X, Y, and Z components of the only line added to LT_DST.

In the specific examples of FIGS. 5E and 5F, the parameter 'src_tab' in the 'for' statement and the 'dst_tab' parameter in the 'insert' statements are regarded as "context nodes" for the assignment statements listed in the statement block. More specifically, 'src_tab' is a source context node for all source variables within the enclosed 'for' loop of FIG. 5F, while 'dst_tab' of FIGS. 5E and 5F is a result context node for all source or destination variables within the block associated with the 'insert' statement. In some examples, the top-level source context node of the mapping definition is the first source parameter listed in the mapping definition, while the top-level result context node is the first result parameter listed. In at least one implementation, these context nodes help enforce the non-imperative nature of the mapping by ensuring that a source parameter cannot appear on the result side of an assignment, while a result parameter cannot appear on the input side of an assignment. In addition, use of context nodes may greatly simplify the programming of large data structure transformations due to the abbreviated syntax associated with the context nodes.

FIG. 5G illustrates an example 500G of a looping 'for' statement with an embedded 'where' clause. In the mapping definition disclosed in the LINES string, two source parameters ('src_tab' and 'item_tab') and one result parameter ('dst_tab') are defined. Within an outer loop over each 'item' line in 'item_tab', a KEY.A component of each 'src' line in 'src_tab' is checked to determine whether it contains a value equal to a PARENT.E component of the current line of 'item_tab'. For each 'src' line of 'src_tab' in which the equality is true (in other words, a matching key is found), a line is inserted into 'dst_tab', and several assignments are made to components X, Y, and Z of that line. More specifically, the component KEY.A value of the current 'src' line is assigned to the X component, the component F of the current 'item' line is assigned to the Y component, and the component KEY.D value of the current 'item' line is assigned to the Z component. By employing a key to selectively perform mappings in this fashion, the type of 'for' loop shown in FIG. 5G may improve processing time over a loop that performs a mapping for every line in 'src_tab' from $O(n^2)$ ("on the order of $n^2$") to $O(n*\log(n))$.

In the first portion 106 of the source code 104 employing the second portion 108, the MAPPER object is created using the mapping definition, an LT_SRC table and an LT_ITEM table are assigned to the 'src_tab' and 'item_tab' parameters, respectively, and an LT_DST table is assigned to the 'dst_tab' formal parameter. After the bindings are specified, the mapping is executed via the EXECUTE method.

Presuming the presence of at least four 'item' lines in LT_ITEM having a component PARENT.E value of 69190, the mapping iterates through each 'src' line in the LT_SRC table having a component KEY.A with a matching value. Presuming one such 'src' line matches, four separate lines (corresponding to the four 'item' lines in LT_ITEM) are inserted into the LT_DST data structure. Further, for each LT_ITEM line, the X component is assigned the matching KEY.A value of 69190, the Y component is assigned with the component F value of the current 'item' line of LT_ITEM (shown as 'Walldorf North', 'Walldorf South', 'Walldorf East', and 'Walldorf West', respectively), and the Z component is assigned with the component KEY.D value of the current 'item' line (in each case, 1). Thus, specific lines may be inserted and populated based on particular component value matches between the LT_ITEM and LT_SRC data structures.

Other types of statements or operations, such as alternative types of assignments, looping structures, conditional statements, and the like, may also be employed in other examples for the second programming language discussed above. For example, the second programming language may include an explicit serialization command that allows a programmer to specify the execution order of at least two data assignments explicitly. An example of such a command may be "assignment_A THEN assignment_B". For instance, assignment_A may involve the copying of an input data structure to an output data structure, while assignment_B may cause a particular component of the data structure to then be assigned a different value. Such a serialization command may thus provide information to an optimization process that assignment_A and assignment_B are to be performed in the specified order, similar to what is presumed in an imperative programming language.

In at least some of the examples discussed above, a programmer may possess the ability to write at least some portions of source code in an alternative language other than that directly supported by the compiler. Such capability may allow the programmer to employ the alternative language in cases in which such a language is better suited than the original language for a particular task at hand.

While many of the examples cited above refer to computer programs, such as those that may be executed on a general-purpose computer system, other examples may be employed in other environments, such as embedded computing systems, including those in which a single set of executable code is loaded and executed on the embedded computing system at any one time.

Figure 6:
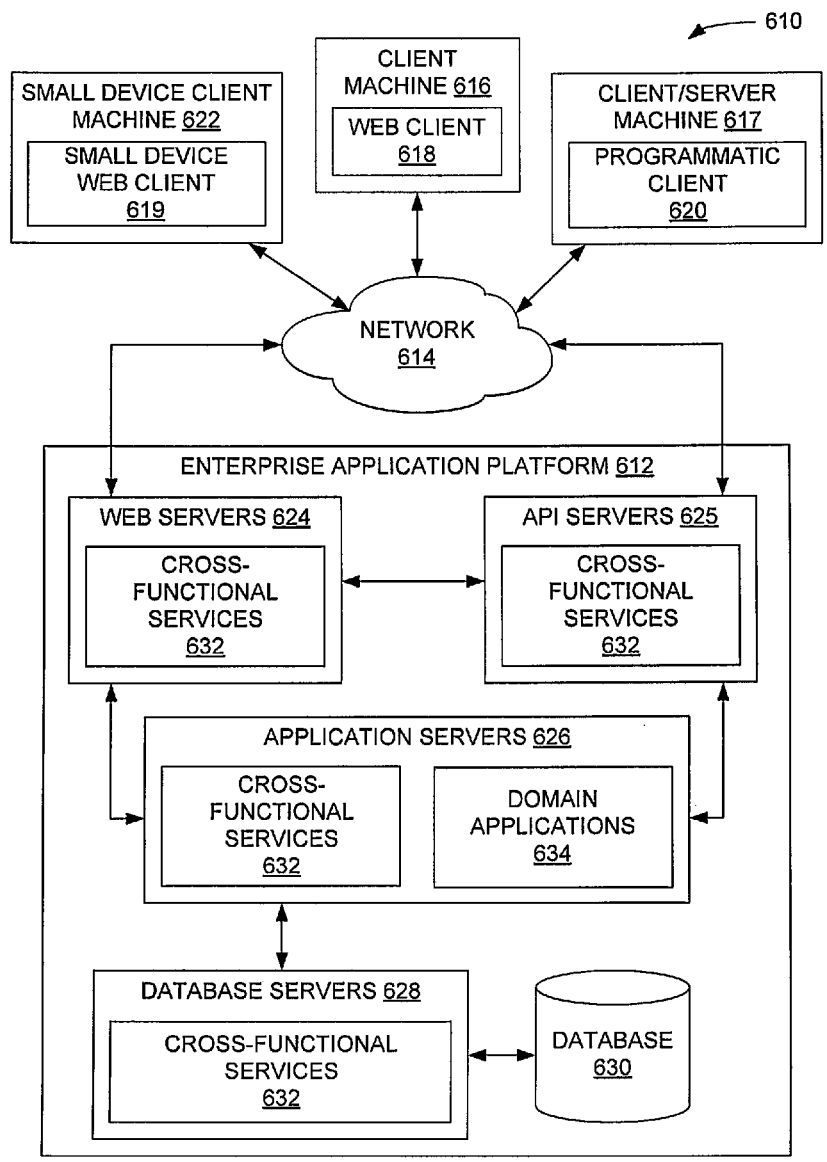
FIG. 6 is a block diagram of an example system having a client-server architecture for an enterprise application platform capable of employing the executable code of FIG. 1.

FIG. 6 is a network diagram depicting an example system 610, according to one exemplary embodiment, having a client-server architecture. A platform (e.g., machines and software), in the exemplary form of an enterprise application platform 612, provides server-side functionality via a network 614 (e.g., the Internet) to one or more clients. FIG. 6 illustrates, for example, a client machine 616 with a web client 618 (e.g., a browser, such as the INTERNET EXPLORER browser developed by Microsoft Corporation of Redmond, Wash. State), a small device client machine 622 with a small device web client 619 (e.g., a browser without a script engine) and a client/server machine 617 with a programmatic client 620.

Turning specifically to the enterprise application platform 612, web servers 624, and Application Program Interface (API) servers 625 are coupled to, and provide web and programmatic interfaces to, application servers 626. The application servers 626 are, in turn, shown to be coupled to one or more database servers 628 that may facilitate access to one or more databases 630. The web servers 624, Application Program Interface (API) servers 625, application servers 626, and database servers 628 may host cross-functional services 632. The application servers 626 may further host domain applications 634.

The cross-functional services 632 may provide user services and processes that utilize the enterprise application platform 612. For example, the cross-functional services 632 may provide portal services (e.g., web services), database services, and connectivity to the domain applications 634 for users that operate the client machine 616, the client/server machine 617, and the small device client machine 622. In addition, the cross-functional services 632 may provide an environment for delivering enhancements to existing applications and for integrating third party and legacy applications with existing cross-functional services 632 and domain applications 634. Further, while the system 610 shown in FIG. 6 employs a client-server architecture, the present disclosure is of course not limited to such an architecture, and could equally well find application in a distributed, or peer-to-peer, architecture system.

Figure 7:
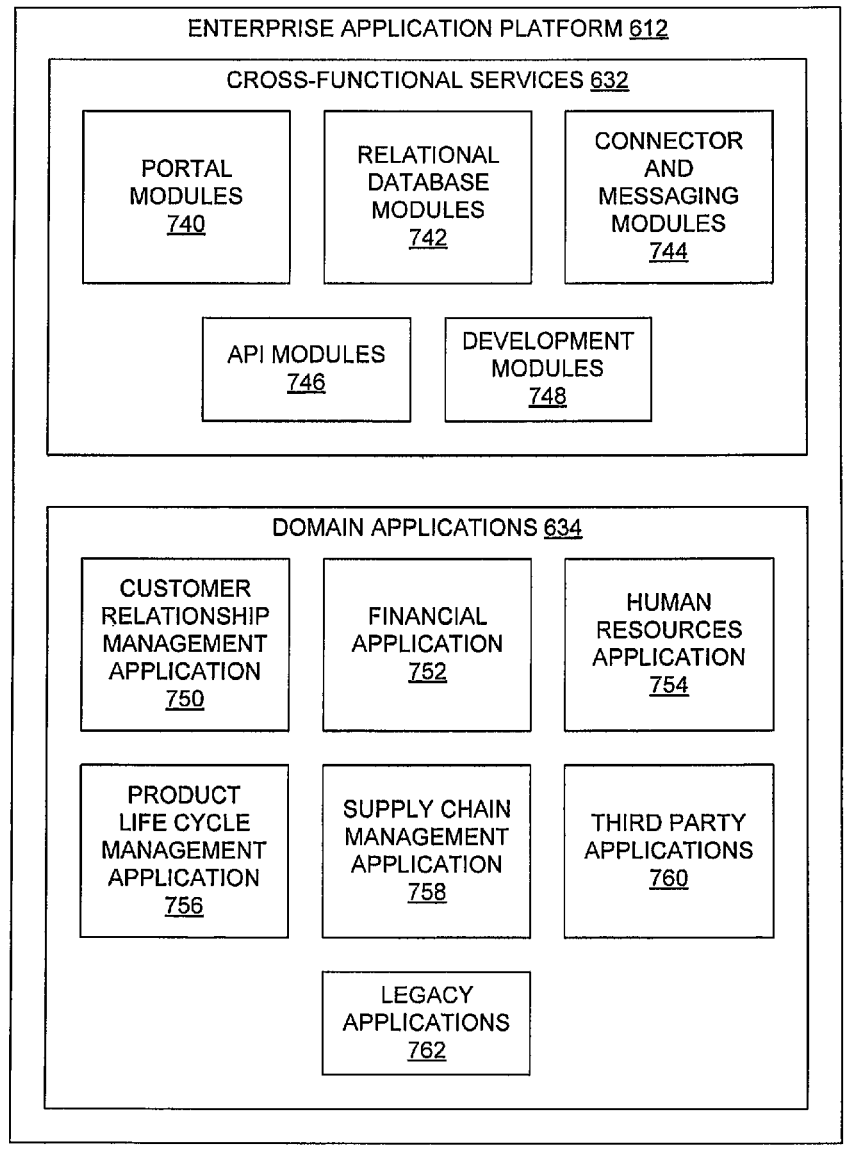
FIG. 7 is a block diagram of example applications and modules employable in the enterprise application platform of FIG. 6.

FIG. 7 is a block diagram illustrating example enterprise applications and services as embodied in the enterprise application platform 612, according to an exemplary embodiment. The enterprise application platform 612 includes cross-functional services 632 and domain applications 634. The cross-functional services 632 include portal modules 740, relational database modules 742, connector and messaging modules 744, Application Program Interface (API) modules 746, and development modules 748.

The portal modules 740 may enable a single point of access to other cross-functional services 632 and domain applications 634 for the client machine 616, the small device client machine 622, and the client/server machine 617. The portal modules 740 may be utilized to process, author, and maintain web pages that present content (e.g., user interface elements and navigational controls) to the user. In addition, the portal modules 740 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 740 may include, in one implementation, a generation module, a communication module, a receiving module, and a regenerating module. In addition, the portal modules 740 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, UDDI, and Microsoft-.NET.

The relational database modules 742 may provide support services for access to the database 630 (FIG. 6) that includes a user interface library. The relational database modules 742 may provide support for object relational mapping, database independence, and distributed computing. The relational database modules 742 may be utilized to add, delete, update, and manage database elements. In addition, the relational database modules 742 may comply with database standards and/or utilize a variety of database technologies including, but not limited to, SQL, SQLDBC, Oracle, MySQL, Unicode, and JDBC.

The connector and messaging modules 744 may enable communication across different types of messaging systems that are utilized by the cross-functional services 632 and the domain applications 634 by providing a common messaging application processing interface. The connector and messaging modules 744 may enable asynchronous communication on the enterprise application platform 612.

The Application Program Interface (API) modules 746 may enable the development of service-based applications by exposing an interface to existing and new applications as services. Repositories may be included in the platform as a central place to find available services when building applications.

The development modules 748 may provide a development environment for the addition, integration, updating, and extension of software components on the enterprise application platform 612 without impacting existing cross-functional services 632 and domain applications 634.

Turning to the domain applications 634, the customer relationship management applications 750 may enable access to and facilitate collecting and storing of relevant personalized information from multiple data sources and business processes. Enterprise personnel that are tasked with developing a buyer into a long-term customer may utilize the customer relationship management applications 750 to provide assistance to the buyer throughout a customer engagement cycle.

Enterprise personnel may utilize the financial applications 752 and business processes to track and control financial transactions within the enterprise application platform 612. The financial applications 752 may facilitate the execution of operational, analytical and collaborative tasks that are associated with financial management. Specifically, the financial applications 752 may enable the performance of tasks related to financial accountability, planning, forecasting, and managing the cost of finance.

The human resources applications 754 may be utilized by enterprise personal and business processes to manage, deploy, and track enterprise personnel. Specifically, the human resources applications 754 may enable the analysis of human resource issues and facilitate human resource decisions based on real-time information.

The product life cycle management applications 756 may enable the management of a product throughout the life cycle of the product. For example, the product life cycle management applications 756 may enable collaborative engineering, custom product development, project management, asset management, and quality management among business partners.

The supply chain management applications 758 may enable monitoring of performances that are observed in supply chains. The supply chain management applications 758 may facilitate adherence to production plans and on-time delivery of products and services.

The third-party applications 760, as well as legacy applications 762, may be integrated with domain applications 634 and utilize cross-functional services 632 on the enterprise application platform 612.

Figure 8:
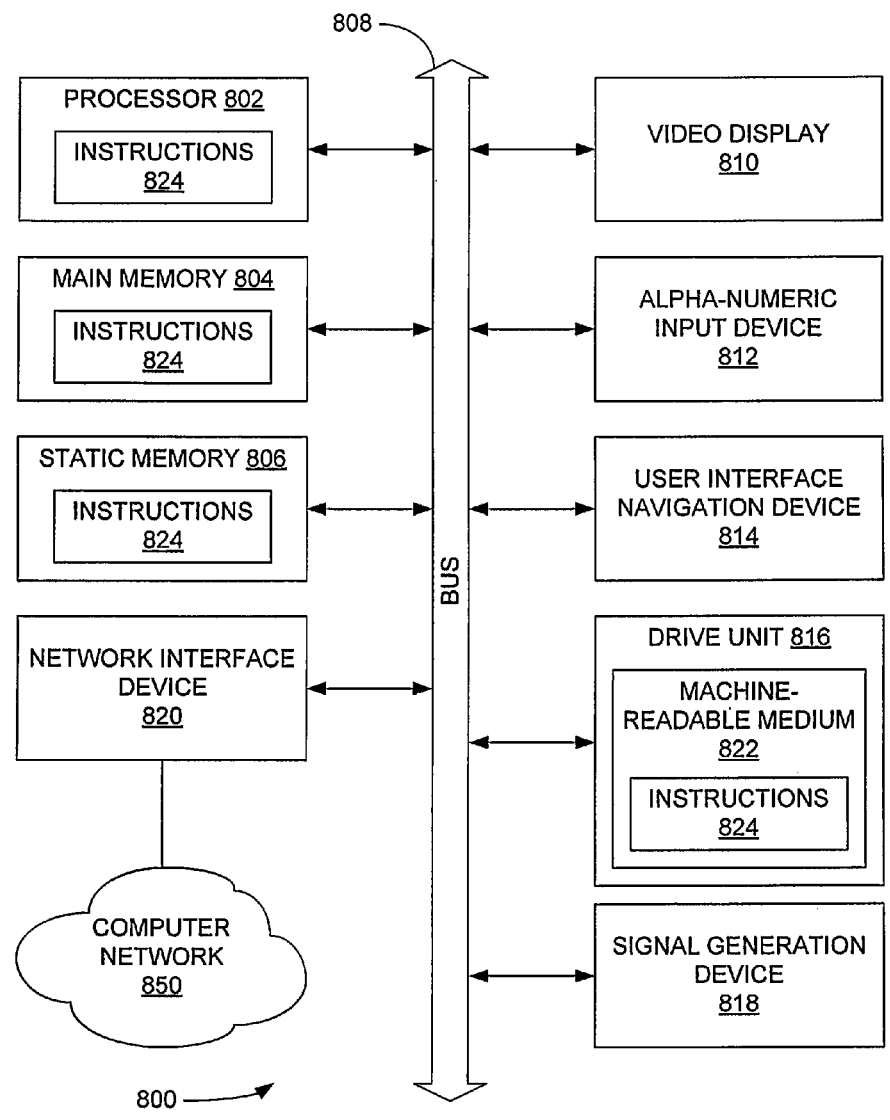
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (for example, a central processing unit (CPU), a graphics processing unit (GPU), or both), a main memory 804 (for example, random access memory), and static memory 806 (for example, static random-access memory), which communicate with each other via bus 808. The processing system 800 may further include video display unit 810 (for example, a plasma display, a liquid crystal display (LCD), or a cathode ray tube (CRT)). The processing system 800 also includes an alphanumeric input device 812 (for example, a keyboard), a user interface (UI) navigation device 814 (for example, a mouse), a disk drive unit 816, a signal generation device 818 (for example, a speaker), and a network interface device 820.

The disk drive unit 816 (a type of non-volatile memory storage) includes a machine-readable medium 822 on which is stored one or more sets of data structures and instructions 824 (for example, software) embodying or utilized by any one or more of the methodologies or functions described herein. The data structures and instructions 824 may also reside, completely or at least partially, within the main memory 804, the static memory 806, and/or within the processor 802 during execution thereof by processing system 800, with the main memory 804 and processor 802 also constituting machine-readable, tangible media.

The data structures and instructions 824 may further be transmitted or received over a computer network 850 via network interface device 820 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 800) or one or more hardware modules of a computer system (for example, a processor 802 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 802 that are temporarily configured (for example, by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine but deployed across a number of machines. In some example embodiments, the processors 802 may be located in a single location (for example, within a home environment, within an office environment, or as a server farm), while in other embodiments, the processors 802 may be distributed across a number of locations.

While the embodiments are described with reference to various implementations and exploitations, it will be understood that these embodiments are illustrative and that the scope of claims provided below is not limited to the embodiments described herein. In general, techniques for providing managerial access to a managed system may be implemented with facilities consistent with any hardware system or hardware systems defined herein. Many variations, modifications, additions, and improvements are possible.

Plural instances may be provided for components, operations; or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method executable by a processor of a computing system, the method comprising:
providing a compiler for a first programming language, the first programming language allowing a data assignment to depend on a result of a previous data assignment;
accessing in the computing system source code comprising a first portion written in the first programming language and a second portion written in a second programming language, the second programming language preventing a data assignment that depends on a result of a previous data assignment, the second portion comprising a data transformation from a first data structure accessible in the first portion to a second data structure accessible in the first portion;
compiling the source code on the computing system using the compiler to generate executable code to be executed by an engine for the first programming language, the engine for the first programming language comprising an interpretation engine to interpret the second portion during execution of the executable code;
designating each node of the first data structure referenced in the second portion as a read-only node for execution;
designating each node of the second data structure referenced in the second portion as either a read-only node or a write-only node for execution;
designating each sub-node of a read-only node of the second data structure as a read-only node for execution; and
designating each sub-node of a write-only node of the second data structure as a write-only node for execution.

2. The method of claim 1, the interpretation engine to:
identify a first node of the first data structure as a base node for a result component of a data assignment specified in the second portion; and
identify a second node of the second data structure as a base node for a source component of the data assignment specified in the second portion.

3. The method of claim 2, the first node and the second node being determined by a context of the data assignment within the second portion.

4. The method of claim 1, the interpretation engine to generate an evaluation tree representing logic of the second portion.

5. The method of claim 4, the interpretation engine to optimize the evaluation tree based on each data assignment in the second portion not depending on a result of a previous data assignment in the second portion.

6. The method of claim 5, the optimization of the evaluation tree comprising parallelizing at least two data assignments represented in the evaluation tree.

7. The method of claim 1, the executable code to instantiate an object of a class defined in an object-oriented library, the object comprising programming logic of the second portion.

8. The method of claim 1, the second portion comprising a character string representing programming logic of the second portion, the second portion being recognized as a character string according to the first programming language.

9. The method of claim 1, the second programming language comprising an explicit serialization command specifying an order of execution between a first data assignment and a second data assignment.

10. A system, comprising:
at least one processor;
a compiler, executable on the at least one processor, for a first programming language, the first programming language allowing a data assignment to depend on a result of a previous data assignment; and
a receiving module, executable on the at least one processor, to receive source code comprising a first portion written in the first programming language and a second portion written in a second programming language, the second programming language preventing a data assignment that depends on a result of a previous data assignment, the second portion comprising a data transformation from a first data structure accessible in the first portion to a second data structure accessible in the first portion;
the compiler to compile the source code to generate executable code to be executed by an engine for the first programming language, the engine for the first programming language comprising an interpretation engine configured to:
interpret the second portion during execution of the executable code;
designate each node of the first data structure referenced in the second portion as a read-only node for execution;
designate each node of the second data structure reference in the second portion as either a read-only node or a write-only node for execution;
designate each sub-node of a read-only node of the second data structure as a read-only node for execution; and
designate each sub-node of a write-only node of the second data structure as a write-only node for execution.

11. The system of claim 10, further comprising a library module comprising code representing the interpretation engine.

12. The system of claim 11, the executable code to instantiate an object of a class defined in the library module for the second portion.

13. The system of claim 10, the interpretation engine to:
identify a first node of the first data structure as a base node for a result component of a data assignment specified in the second portion; and
identify a second node of the second data structure as a base node for a source component of the data assignment specified in the second portion.

14. The system of claim 13, the first node and the second node being determined by a context of the data assignment within the second portion.

15. The system of claim 10, the interpretation engine to generate an evaluation tree representing logic of the second portion.

16. The system of claim 15, the interpretation engine to optimize the evaluation tree based on each data assignment in the second portion not depending on a result of a previous data assignment in the second portion.

17. The system of claim 16, the optimization of the evaluation tree comprising parallelizing at least two data assignments represented in the evaluation tree.

18. The system of claim 10, the second programming language comprising an explicit serialization command specifying an order of execution between a first data assignment and a second data assignment.

19. A non-transitory computer-readable storage medium comprising instructions that, when executed on at least one processor of a machine, cause the machine to perform operations comprising:
accessing in a computing system source code comprising a first portion written in a first programming language and a second portion written in a second programming language, the second portion comprising a data transformation from a first data structure accessible in the first portion to a second data structure accessible in the first portion, the first programming language allowing a data assignment to depend on a result of a previous data assignment, and the second programming language preventing a data assignment that depends on a result of a previous data assignment; and compiling the source code on the computing system using a compiler for the first programming language to generate executable code to be executed by an engine for the first programming language, the engine for the first programming language comprising an interpretation engine to:

interpret the second portion during execution of the executable code;

designate each node of the first data structure referenced in the second portion as a read-only node for execution;

designate each node of the second data structure reference in the second portion as either a read-only node or a write-only node for execution;

designate each sub-node of a read-only node of the second data structure as a read-only node for execution; and designate each sub-node of a write-only node of the second data structure as a write-only node for execution.

\* \* \* \* \*